March 1, 1955  B. N. ASHTON ET AL  2,703,217
BALANCED PLUNGER CONTROLLED CHECK VALVE
Filed June 12, 1951

INVENTORS.
BENJAMIN N. ASHTON
EDMUND D. HOLLAND
BY

THEIR ATTORNEYS.

2,703,217

BALANCED PLUNGER CONTROLLED CHECK VALVE

Benjamin N. Ashton and Edmund D. Holland, Kingston, N. Y., assignors to Electrol Incorporated, Kingston, N. Y., a corporation of Delaware Application June 12, 1951, Serial No. 231,175

4 Claims. (Cl. 251—282)

This invention relates to improvements in check valves and it relates more particularly to a form of check valve which can be manually or mechanically actuated to permit flow of fluid therethrough in either direction without the application of excessive force even when operating under conditions of high pressure differential on opposite sides of the check valve member.

A conventional type of check valve includes a valve plug which is normally urged by means of a spring or its equivalent against a seat in a valve casing to prevent the flow of liquid through the valve in one direction while permitting the valve to be unseated by fluid pressure to allow the flow of liquid through the valve in the opposite direction. Check valves of the above-described type are entirely satisfactory for most purposes. Under some conditions, however, it would be advantageous to provide means whereby such a check valve could be opened manually or mechanically to allow liquid to flow in either direction through the check valve. In some hydraulic systems where the pressure of the liquid is relatively low, it is not much of a problem to provide a plunger release for unseating the valve member. However, in high pressure systems, such as, for example, the hydraulic system of an aeroplane, a simple plunger mechanism is not very satisfactory because the valve plug must be unseated under the conditions where the pressure differential may be as much as 1,000 lbs. per square inch or even higher. Therefore, even if the valve plug has a relatively small cross-sectional area, very large force must be applied to the release plunger to unseat the valve plug.

In accordance with the present invention, a check valve is provided in which the valve plug can move in the manner of the valve plug of a conventional check valve and can also be unseated to allow flow of liquid therethrough in either direction by a manually or mechanically operated plunger which operates under conditions of balanced pressure and thereby requires very little force for actuation.

More particularly, the valve plug may be connected by means of a sliding connection with a piston which is subjected at its opposite ends to the same pressures as those to which the valve plug is subjected so that the pressures thereon are equalized or neutralized and an essentially balanced condition of the valve plug and the piston is produced. The piston may be operated by means of a plunger accessible from the exterior of the valve casing so that it can be depressed manually or by mechanical means as may be required.

For a better understanding of the present invention, reference may be had to the accompanying drawing, in which.

Figure 1:
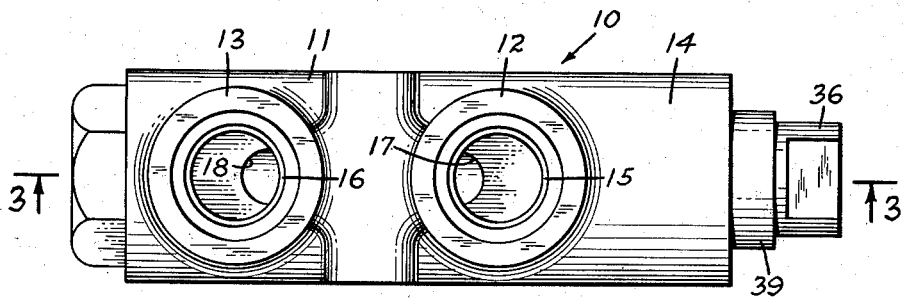
Fig. 1 is a plan view of a typical valve embodying the present invention.
Figure 3:
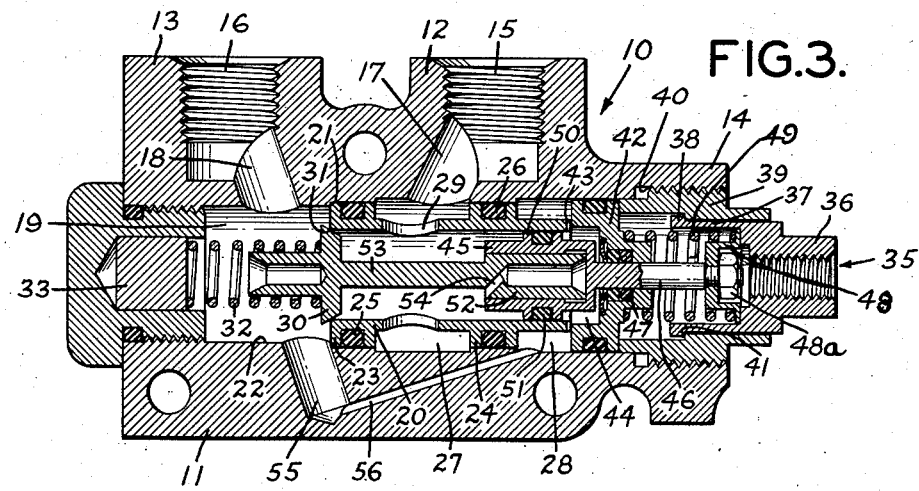
Fig. 3 is a view in section taken on line 3—3 of Fig. 1.
Figure 2:
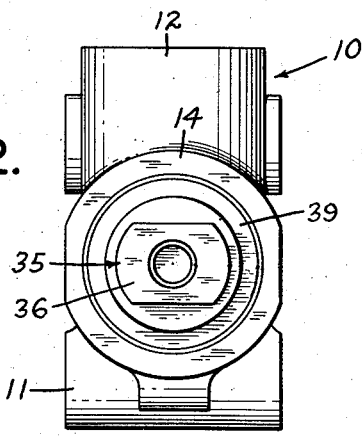
Fig. 2 is a view in end elevation of the valve.

The valve selected for purposes of illustration includes a valve casing 10 which, as shown in Fig. 1, has a body portion 11 of generally rectangular cross-section and two upstanding generally cylindrical bosses 12 and 13 thereon which form, respectively, the inlet coupling and outlet coupling of the valve. The right-hand end of the casing 10 carries a generally cylindrical extension 14 for housing a portion of the operating mechanism as described hereinafter. As illustrated in Figs. 1 and 3, the bosses 12 and 13 are provided with internally threaded bores 15 and 16 which communicate through angle drilled passages 17 and 18 with a generally cylindrical bore 19 extending lengthwise of the casing. The bore 19 forms the valve chamber of the valve and is fitted with an internal sleeve 20 which abuts against a shoulder 21 between the passages 17 and 18 to limit its movement toward the left-hand end of the valve casing. The sleeve 20 is maintained in sealing engagement with the internal wall 22 which defines the valve chamber 19 by means of suitably grooved flanges 23 and 24 containing the rubbery sealing rings 25 and 26 which bear against the wall 22. The major portion of the sleeve 20 is maintained in spaced relation to the wall 22 around the chamber to provide the fluid-receiving chambers 27 and 28 on opposite sides of the flange 24. The sleeve 20 is provided with openings or passages 29 between the flanges 23 and 24 so that fluid can flow through the bore 15, the passage 17, the fluid receiving chamber 27 and the aperture 29 into the interior of the sleeve.

Flow of the liquid through the sleeve 20 is controlled by the valve plug 30 which, as illustrated, is of the cone poppet type and bears against the inner annular edge 31 of the sleeve 20, this edge forming the valve seat. The valve plug 30 is urged toward the seat 31 by means of a coil spring 32 bearing against the outer face of the valve plug 30 and against the threaded plug member 33 which is screwed into the left-hand end of the bore 19 and closes it. The valve 30, as described is responsive to liquid pressure at the inlet port 15 and when the pressure increases sufficiently to overcome the pressure of the spring 32, the valve plug 30 will be displaced from its seat so that liquid can flow past the valve plug out through the passage 18 and the outlet port 16. Liquid cannot, however, flow from the port 16 to the port 15 because the valve is seated, under such conditions, by means of the spring 32 and the pressure of the liquid on the valve plug.

In accordance with the present invention, the valve plug 30 can be dislodged from its seat by means of a manually operated or mechanically actuated plunger member 35 which extends out of the cylindrical extension 14 at the right-hand end of the casing. The plunger 35 includes a tubular portion 36 carrying at its inner end a larger tubular or cup-like member 37 having an outwardly directed rim or flange 38 at its inner end. The plunger 35 is received slidably in a sleeve 39 which is screwed into an enlarged bore 40 in the extension 14. The sleeve 39 has a shoulder 41 therein to engage the flange 38 and limit the outward movement of the plunger 36. The plunger is inserted in the sleeve 36 before the latter is screwed into the enlargement 40.

The inner end of the sleeve 38 abuts against and positions a partition ring or disc 42 which extends across the bore 19 adjacent the right-hand end of the sleeve 20. The end of the sleeve 20 is provided with a series of small notches 43 which permit the flow of liquid from the liquid receiving chamber 28 into the right-hand end of the sleeve 20. Inasmuch as the partition ring 42 engages the right-hand end of the sleeve, these elements are maintained in fixed relation in the casing.

The left-hand face of the partition ring 42 is provided with a cylindrical recess 44 to receive the right-hand end of a hollow cup-like piston member 45. The piston member has the same surface area as the effective area of the valve plug 36 and is mounted on a stem 46 which extends through a packing 47 carried by the partition 42. The stem 46 is connected to a flanged cup-shaped member 48 by means of a nut 48a on the end of the shaft 46. The member 48 is urged against the inner face of the plunger 36 by means of a spring 49 engaging the plate 42 and the member 48.

The piston 45 includes an outer grooved flange 50 receiving a rubber sealing ring 51 which prevents leakage along the sleeve 20 past the piston. The hollow piston 45 receives a hollow extension 52 mounted on the inner end of a stem 53 fixed to the right-hand face of the valve plug 30. The hollow extension 52 fits slidably in the piston and has a port 54 therein to permit entry of liquid into the hollow interior of the extension so that the extension can slide freely relative to the piston, there being no locking up of these elements by fluid pressure.

From the preceding description it will be clear that the left-hand face of the piston and the right-hand face of the valve member are subjected to substantially equal pressures, inasmuch as their effective areas are about the same. The left-hand face of the valve member 30 is, however, subjected to a pressure which may be substantially higher or substantially lower than the pressure exerted on the right-hand end of the piston so that the valve, as described above, is unbalanced and would normally require the exertion of substantial force to unseat the valve plug 30 when the pressure at the port 16 exceeds the pressure at the port 15 substantially. To overcome the unbalanced condition described above, the casing is drilled to provide passages 55 and 56 which communicate with each other and with the bore 19 to the left of the valve plug 30 and the liquid receiving space 28 at the right-hand end of the sleeve 20. Inasmuch as the space 28 communicates with the recess 44 to the right of the piston, it will be clear that the left-hand end of the valve plug 30 and the right-hand end of the piston 45 will be subjected to essentially the same pressure. Inasmuch as the right-hand face of the valve plug 30 and the left-hand end of the piston 45 are subjected to the same pressure, the valve and plunger assembly is in a substantially balanced condition. Accordingly, regardless of the pressure differential on opposite sides of the valve plug 30, it can be displaced by a pressure on the plunger 35 only slightly greater than that of the spring 32 and the spring 49.

The presence of the piston 45 does not disturb the normal operation of the valve member 30 as a check valve inasmuch as the valve member is movable freely with respect to the piston.

From the preceding description, it will be apparent that a check valve has been provided which operates like a check valve of conventional type but which also is capable of being opened manually or by mechanical means with a minimum amount of pressure regardless of the difference in pressure exerted on opposite sides of the valve member itself.

It will be understood further that the valve construction is susceptible to considerable modification in the shape and design of the casing, its over-all size, depending upon requirements, and in the specific type of valve member and seat desired. Accordingly, the form of the invention described herein should be considered as illustrative and not as limiting the scope of the following claims.

We claim:

1. A controllable check valve comprising a casing having spaced apart first and second ports, a valve seat in said casing between said ports, a valve member movable in said casing and having a plug movable toward said first port into engagement with said seat and away from said seat towards said second port and to permit liquid to flow in either direction, a stem extending from said plug lengthwise of said casing through said seat, a piston slidable lengthwise of said casing on the opposite side of said first port from said valve seat, said piston having its inner end subjected to the liquid pressure at said first port, said piston having a recess therein receiving the stem for relative sliding movement, a plunger in alignment with said piston and movable lengthwise of said casing to move the piston and said valve member lengthwise of said casing to unseat said valve plug, a separate passage in the casing isolated from said first port to supply liquid pressure from said second port tto the opposite end of said piston from said first port to subject the opposite end of said piston to the pressure at said second port, and means urging said valve plug toward said seat.

2. A plunger-controlled check valve comprising a valve casing having spaced apart first and second ports, a valve seat in said casing between said ports, a valve plug in said casing movable into and out of engagement with said seat, said plug being movable toward said first port to engage said seat and toward said second port out of engagement with said seat, a stem on said plug extending through said seat, a piston member slidable in said casing on the opposite side of said first port from said seat and having an inner end exposed to liquid pressure at said first port, a plunger extending to the exterior of said casing and depressible to move said piston toward said seat, said piston having a recess slidably receiving and guiding the end portion of said stem and engaging the end portion of said stem to move the latter and disengage the plug from the seat upon depression of said plunger, means permitting flow of liquid between said recess and the first port side of said casing to enable relative movement of said piston and stem, and a separate passage in said casing isolated from said first port and connecting the second port to the interior of said casing on the opposite end of said piston from said first port to subject said opposite end of said piston to the liquid pressure at said second port.

3. A plunger-controlled check valve comprising a hollow casing having a first port and a second port, a sleeve in said casing and having an end portion positioned between said first port and said second port and forming a valve seat, said sleeve extending past said first port toward one end of said casing and having an opening therein to admit liquid from said first port into said sleeve, a valve plug in said casing movable into and out of engagement with said seat, means normally urging said valve plug toward said seat, a stem on said valve plug extending through said seat and lengthwise of said sleeve and having an inner end portion on the opposite side of said opening from said valve seat, a piston slidable in said sleeve and engaging said inner end portion of said stem, said piston having its inner end exposed to the liquid pressure at said first port, a partition in said casing on the opposite side of said piston from said valve stem, a plunger extending to the exterior of said casing for displacing said piston lengthwise of said casing to disengage said plug from said seat, and a separate passage in said casing isolated from said first port and connecting said second port to the interior of said sleeve between said piston and said partition to substantially balance the liquid pressure exerted on the valve plug and piston.

4. The check valve set forth in claim 3 comprising a recess in said piston to receive slidably said inner end portion of said stem, an abutment in said recess to limit inward movement of said stem, and means for admitting liquid into and discharging liquid from said recess to permit relative movement of said stem and said piston.

References Cited in the file of this patent

UNITED STATES PATENTS

| 515,703 | Birkery | Feb. 27, 1894 |
| 718,694 | Chapman | Jan. 20, 1903 |
| 2,039,638 | Druge | May 5, 1936 |
| 2,141,069 | Newell | Dec. 20, 1938 |

FOREIGN PATENTS

| 8,319 | Great Britain | May 14, 1891 |
| 453,899 | Great Britain | Sept. 21, 1936 |